United States Patent
Chen et al.

(10) Patent No.: US 11,498,992 B2
(45) Date of Patent: Nov. 15, 2022

(54) LOW SHEEN PAINT COMPOSITION WITH EFFECTIVE OPACITY

(71) Applicants: Rohm and Haas Company, Collegeville, PA (US); Dow Global Technologies LLC, Midland, MI (US)

(72) Inventors: Junyu Chen, Shanghai (CN); Wei Cui, Shanghai (CN); Tao Wang, Shanghai (CN); Tao Wang, Highton (AU); Qianqian Li, Shanghai (CN); Juan Li, Shanghai (CN); Longlan Cui, Shanghai (CN); David G. Speece, Jr., North Wales, PA (US)

(73) Assignees: Dow Global Technologies LLC, Midland (ML); Rohm and Has Company, Philadelphia, PA (US)

( * ) Notice: Subject to any disclaimer, the term of this patent is extended or adjusted under 35 U.S.C. 154(b) by 758 days.

(21) Appl. No.: 15/564,502

(22) PCT Filed: Apr. 28, 2015

(86) PCT No.: PCT/CN2015/077607
§ 371 (c)(1),
(2) Date: Oct. 5, 2017

(87) PCT Pub. No.: WO2016/172832
PCT Pub. Date: Nov. 3, 2016

(65) Prior Publication Data
US 2018/0072911 A1    Mar. 15, 2018

(51) Int. Cl.
| | | |
|---|---|---|
| *C08F 220/38* | (2006.01) | |
| *C09D 133/06* | (2006.01) | |
| *C09D 151/10* | (2006.01) | |
| *C08F 285/00* | (2006.01) | |
| *C08F 292/00* | (2006.01) | |
| *C09D 7/42* | (2018.01) | |
| *C09D 7/40* | (2018.01) | |
| *C09D 7/65* | (2018.01) | |
| *C09C 1/36* | (2006.01) | |
| *C09D 7/62* | (2018.01) | |
| *C08F 220/14* | (2006.01) | |
| *C09D 133/08* | (2006.01) | |
| *C08K 9/10* | (2006.01) | |
| *C08K 3/22* | (2006.01) | |

(52) U.S. Cl.
CPC ........ *C08F 220/382* (2020.02); *C08F 220/14* (2013.01); *C08F 285/00* (2013.01); *C08F 292/00* (2013.01); *C09C 1/3676* (2013.01); *C09D 7/42* (2018.01); *C09D 7/62* (2018.01); *C09D 7/65* (2018.01); *C09D 7/69* (2018.01); *C09D 133/06* (2013.01); *C09D 133/08* (2013.01); *C09D 151/10* (2013.01); *C08K 9/10* (2013.01); *C08K 2003/2241* (2013.01)

(58) Field of Classification Search
CPC ...... C09D 151/10; C09D 7/69; C09D 133/06; C09D 7/65; C09D 7/42; C09D 133/08; C09C 1/3676; C08K 3/00; C08F 220/38; C08F 220/14; C08F 292/00; C08F 285/00; C08F 220/34; C08F 220/18; C08F 220/06; C08F 220/40; C08F 212/08; C08F 2220/1825
USPC .......................................... 524/524
See application file for complete search history.

(56) References Cited

U.S. PATENT DOCUMENTS

| | | | |
|---|---|---|---|
| 4,290,930 A * | 9/1981 | Nolken | C08F 2/24 |
| | | | 428/500 |
| 5,360,827 A | 11/1994 | Toda et al. | |
| 7,378,153 B2 | 5/2008 | Yamamoto et al. | |
| 7,488,534 B2 | 2/2009 | Koller et al. | |
| 8,609,759 B2 | 12/2013 | Fasano et al. | |
| 8,829,083 B2 | 9/2014 | Lundgard et al. | |
| 9,816,002 B2 * | 11/2017 | Wang | C09D 143/02 |
| 2004/0062913 A1 | 4/2004 | Suto et al. | |
| 2009/0202724 A1 | 8/2009 | Arai et al. | |
| 2010/0063171 A1 | 3/2010 | Roschmann et al. | |
| 2010/0249295 A1 | 9/2010 | Hong | |
| 2011/0159309 A1 | 6/2011 | Jiang et al. | |
| 2011/0183134 A1 | 7/2011 | Bulluck et al. | |
| 2014/0371343 A1 | 12/2014 | Yan et al. | |

FOREIGN PATENT DOCUMENTS

| | | | |
|---|---|---|---|
| EP | 0022633 | A2 | 1/1981 |
| EP | 0154739 | A2 | 9/1985 |
| EP | 0404184 | A2 | 12/1990 |
| EP | 0915108 | A1 | 5/1999 |
| EP | 0959176 | A1 | 11/1999 |
| EP | 1834995 | A1 | 9/2007 |
| GB | 2309702 | A | 8/1997 |
| WO | 0068304 | A1 | 11/2000 |
| WO | 2013123357 | A1 | 8/2013 |
| WO | 2013181793 | A1 | 12/2013 |
| WO | 2014056184 | A1 | 4/2014 |

OTHER PUBLICATIONS

Product Data Sheet for Ti-Pure R-706 (Year: 2015).*
International Search Report; International Application No. PCT/CN2015/077607; International Filing Date Apr. 28, 2015; dated Feb. 2, 2016; 4 pages.

(Continued)

Primary Examiner — Angela C Scott
(74) Attorney, Agent, or Firm — Karl E. Stauss; Cantor Colburn LLP

(57) ABSTRACT

The present invention provides an aqueous paint composition comprising by dry weight based on total dry weight of the pigment composition, from 11% to 35% of a polymeric duller of (co)polymeric particles having an average diameter of from 1 to 20 μm, and from 25% to 70% of titanium dioxide particles; wherein from 50% to 100% of the titanium dioxide particles are encapsulated by polymer shell of (co)polymeric particles.

7 Claims, No Drawings

(56) References Cited

OTHER PUBLICATIONS

Written Opinion of the International Searching Authority; International Application No. PCT/CN2015/077607; International Filing Date Apr. 28, 2015; dated Feb. 2, 2016; 3 pages.

* cited by examiner

LOW SHEEN PAINT COMPOSITION WITH EFFECTIVE OPACITY

FIELD OF THE INVENTION

The present invention relates to a low sheen paint composition with effective opacity.

INTRODUCTION

Control of gloss is critical in the design and application of protective and/or decorative low sheen paints. One way to lower gloss comprises adding matting agents, also known as dullers, which are either inorganic particles, such as silica or calcium carbonate particles, or organic particles, such as polyurethane dispersions or urea-formaldehyde resins that function by roughening the surface of the film. While effective at reducing gloss, these dullers result in a significant degree of light scattering, both forward scatter and backscatter, and in internal and external reflection. Such uncontrolled interaction of light with the duller particles can cause graying, haziness, cloudiness, loss of color intensity and a washed-out appearance of the coated article. Furthermore, such duller particles often disrupt film integrity and can lead to loss of key film properties such as water and abrasion resistance, and flexibility. Still further, such duller particles tend to polish or burnish after rubbing, leading to an increase in gloss.

Researchers recently developed unique polymer particles which may work as dullers and provide paints with tunable gloss control and burnish resistance. However, paints comprising such unique polymers are unable to provide effective opacity to substrates.

It is therefore desired to provide a low sheen paint composition of controlled gloss, and even more importantly, of effective opacity.

SUMMARY OF THE INVENTION

The present invention provides an aqueous paint composition comprising by dry weight based on total dry weight of the pigment composition, from 11% to 35% of a polymeric duller of (co)polymeric particles having an average diameter of from 1 to 20 μm, and from 25% to 70% of titanium dioxide particles, wherein from 50% to 100% of the titanium dioxide particles are encapsulated by (co)polymeric particles.

DETAILED DESCRIPTION OF THE INVENTION

As used herein, the term "(co)polymeric" refers to polymeric or copolymeric.

The present invention provides an aqueous paint composition comprising by dry weight based on total dry weight of the paint composition, from 11% to 35%, preferably from 12% to 25%, and more preferably from 13% to 22%, a polymeric duller of (co)polymeric particles having an average diameter of from 1 to 20 μm, preferably from 2 to 10 μm, and more preferably from 3 to 7 μm; and from 25% to 70%, preferably from 28% to 55%, and more preferably from 30% to 40%, titanium dioxide particles. From 50% to 100%, preferably from 60% to 100%, and more preferably from 70% to 100% by dry weight based on total dry weight of the titanium dioxide particles are encapsulated by polymer shell of (co)polymeric particles.

Optionally, the aqueous paint composition further comprises a binder component comprising film forming organic polymer of (co)polymeric particles.

The (Co)Polymeric Particles

The (co)polymeric particles of the present invention comprise at least one polymerized ethylenically unsaturated nonionic monomer. As used herein, the term "nonionic monomers" refers to monomers that do not bear an ionic charge between pH=1-14. Suitable examples of the ethylenically unsaturated nonionic monomers include alkyl esters of (methyl) acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, and mixtures thereof; (meth)acrylonitrile; (meth)acrylamide; amino-functional and ureido-functional monomers such as hydroxyethyl ethylene urea methacrylate; monomers bearing acetoacetate-functional groups such as acetoacetoxyethyl methacrylate (AAEM); monomers bearing carbonyl-containing groups such as diacetone acrylamide (DAAM); ethylenically unsaturated monomers having a benzene ring such as styrene and substituted styrenes; butadiene; α-olefins such as ethylene, propylene, and 1-decene; vinyl acetate, vinyl butyrate, vinyl versatate and other vinyl esters; vinyl monomers such as vinyl chloride and vinylidene chloride; glycidyl (meth)acrylate; and mixtures thereof.

Preferably, the ethylenically unsaturated nonionic monomers are selected from methyl methacrylate, ethyl acrylate, butyl acrylate, 2-ethylhexyl acrylate, styrene, vinyl acetate, vinyl butyrate, and mixtures thereof.

The (co)polymeric particles may further comprise less than 10%, preferably less than 5%, and more preferably less than 2.5% by dry weight based on total dry weight of the (co)polymeric particles, of a stabilizer monomer. Suitable examples of the stabilizer monomers include sodium styrene sulfonate (SSS), sodium vinyl sulfonate (SVS), 2-acrylamido-2-methylpropanesulfonic acid (AMPS), acrylamide (AM), acrylic acid (AA), methylacrylic acid (MAA), and itaconic acid (IA).

The (co)polymeric particles of the polymeric duller have a minimum film forming temperature (MFFT) of above 50° C., and an average diameter of from 1 to 20 μm.

The (co)polymeric particles of the polymer shell encapsulating the titanium dioxide particles have an MFFT of from −50 to 100° C., and an average diameter of from 200 to 800 nm.

The (co)polymeric particles of the film forming organic polymer of the binder component have an MFFT of from −50 to 100° C., and an average diameter of from 50 to 500 nm.

MFFT is the lowest temperature at which (co)polymeric particles or solid portion of an aqueous polymer dispersion (also called latex or emulsion) self coalesces in the semi dry state to form a continuous polymer film, which in turn acts as a binder for the rest of the solids in the paint film. At temperatures of and above the (co)polymeric particles MFFT, the polymer film is formed. At temperatures below its MFFT, the polymer cannot coalesce to form a continuous film.

Titanium Dioxide Particles

Any titanium dioxide (TiO$_2$) particles can be used in the paint composition of the present invention. Commercially available titanium dioxide particles include TI-PURE™ R-706 and TI-PURE R-902+ from DuPont, TIONA™ 595 of Millennium Inorganic Chemicals, TIOXIDE™ TR92 from Huntsman Corporation, LOMON™ R-996 and LOMON LR-997 of LOMON Corporation, BILLION™ BLR-688 and BILLION BLR-699 from Henan Billions Chemical co., Ltd., DOGUIDE™ SR-237 from Shandong Doguide Group Co., Ltd., NTR-606 from Ningbo Xinfu Titanium Dioxide Co., Ltd., and R-2195 and R-2295 from Dawn Group. Preferably, the titanium dioxide particles are selected from TI-PURE R-706 and TI-PURE R-902+ available from DuPont.

The encapsulation of the polymer shell of (co)polymeric particles on the surface of the titanium dioxide particles can be achieved by polymerization processes. The polymerization processes can be any methods known in the art, including emulsion polymerization, mini-emulsion polymerization, and mechanical dispersing technology.

The Low Sheen Paint Composition

The paint composition may further comprise other pigments or extenders.

As used herein, the term "pigment" refers to a particulate inorganic material which is capable of materially contributing to the opacity or hiding capability of a paint. Pigments typically have a refractive index of equal to or greater than 1.8 and include zinc oxide, zinc sulfide, barium sulfate, and barium carbonate. For the purpose of clarity, titanium dioxide particles of the present invention are not included in the "pigment" of the present invention.

The term "extender" refers to a particulate inorganic materials having a refractive index of less than or equal to 1.8 and greater than 1.3 and include calcium carbonate, aluminium oxide ($Al_2O_3$), clay, calcium sulfate, aluminosilicate, silicate, zeolite, mica, diatomaceous earth, solid or hollow glass, and ceramic bead. The paint composition may optionally contain solid or hollow polymeric particles having a Tg of greater than 60° C., such polymeric particles are classified as extenders for purposes of pigment volume concentration (PVC) calculations herein. The details of hollow polymeric particles are described in EP 22633, EP 915108, EP 959176, EP 404184, U.S. Pat. No. 5,360,827, WO 00/68304, and US 20100063171. The solid polymeric particles have particle sizes of from 1 to 50 microns, and preferably from 5 to 20 microns. A suitable example of the polymeric particles is ROPAQUE™ Ultra E opaque polymer commercially available from The Dow Chemical Company. For the purpose of clarity, the polymeric particles of the present invention are different from the first or the second polymer of the present invention. Calcium carbonate, clay, mica, and aluminium oxide ($Al_2O_3$) are preferred extenders.

PVC (pigment volume concentration) of the paint composition is calculated as follows, PVC (%)=[volume of pigment(s)+volume of extender(s)]/total dry volume of paint.

In a preferred embodiment, the paint composition has a PVC of from 10% to 75%, and preferably from 20% to 70%.

Preparation of the Paint Composition

The preparation of the paint composition can be well-known methods of the art and involves the process of admixing appropriate paint ingredients in the indicated proportions to provide a paint as well as a final dry paint film with the desired properties.

Application of the Paint Composition

The paint composition may be applied by conventional application methods such as brushing, roller application, and spraying methods such as air-atomized spray, air-assisted spray, airless spray, high volume low pressure spray, and air-assisted airless spray.

Suitable substrates for paint application include concrete, cement board, medium-density fiberboard (MDF) and particle board, gypsum board, wood, stone, metal, plastics, wall paper and textile, etc. Preferably, all the substrates are pre-primed by waterborne or solvent-borne primers.

EXAMPLES

I. Raw Materials

A) Chemicals used in making (co)polymeric particles

| Abbreviation | Chemical |
|---|---|
| BA | butyl acrylate |
| MMA | methyl methacrylate |
| (M)AA | (methyl)acrylic acid |
| SEM | 2-sulfoethyl methacrylate |
| DMAEMA | 2-(dimethylamino)ethyl methacrylate |
| n-DDM | n-dodecyl mercaptan |
| AIBN | 2,2'-azobis(isobutyronitrile) |
| DS-4 | sodium dodecyl benzene sulfonate |
| EDTA | ethylene diamine tetraacetic acid |
| SFS | sodium formaldehyde sulfoxylate |
| t-BHP | tert-butyl hydroperoxide |
| ALMA | allyl methacrylate |
| STY | styrene |

B) starting materials used in paint formulations

| Chemical | Supplier |
|---|---|
| FOAMASTER™ NXZ defoamer | Cognis Chemical (China) Co., Ltd. |
| TEGO™ Foamex 825 defoamer | Evonik Industries |
| AMP-95™ base | The Dow Chemical Company |
| OROTAN™ 731A dispersant | The Dow Chemical Company |
| TRITON™ EF-106 wetting agent | The Dow Chemical Company |
| ACRYSOL™ RM-8W rheology modifier | The Dow Chemical Company |
| ACRYSOL™ RM-2020 rheology modifier | The Dow Chemical Company |
| TI-PURE™ R-706 $TiO_2$ | DuPont Company |
| COASOL™ coalescent | The Dow Chemical Company |
| PRIMAL™ AC-365 binder | The Dow Chemical Company |
| LAPONITE RD (3%) anti-settle agent | Rockwood Additives |

II. Test Procedures

1. Gloss Determination

Drawdown of Paint Compositions was made with a 150 μm Bird Film Applicator™ on a BYKO-chart PA-2810 of BYK-Gardner GmbH, and surface gloss was determined by using a BYK-Gardner Micro-TRI-Gloss 20/60/85 Gloss Meter to measure the gloss of dry paint surfaces at respectively 20, 60 and 85 degree geometry.

2. Opacity Determination

Drawdown of Paint Compositions was made with a 150 μm Bird Film Applicator™ on a BYKO-chart PA-2810 of BYK-Gardner GmbH, and was then allowed for drying for 1 day in a constant temperature room (CTR). Contrast ratio of dry paint was determined by a BYK-Gardner 6850 Color-Guide Plus Spectrophotometer. Contrast ratio is a test method for the opacity of paint film, Y values of paint film were tested separately in the white chart ($Y_w$) and black chart ($Y_b$). Contrast ratio was defined as $Y_b/Y_w$. The higher the contrast ratio, the better the opacity.

3. Stain Resistance

Form P121-10N Leneta Scrub Test Panels were coated by paint compositions followed by being dried for 7 days in a CTR (25° C., 50% R.H.). Hydrophilic stains including red wine, coffee, black tea, green tea, and ink were applied by placing cheese clothes saturated with the corresponding stains on the surface across the paint film and were allowed for staying for 2 hours. Prior to the stain resistance test, Y value of each paint film (labeled as Y0) was tested by a BYK-Gardner 6850 Color-Guide Plus Spectrophotometer. Excessive liquid stains were wiped off with a paper towel or cheese cloth. The stain resistance test was conducted on a JTX-architecture paint scrub machine of Shanghai Xiandai Environment Engineering Technique Co., Ltd. with a 3M™ commercial sponge saturated with 1% OMO™ wash powder solution. Each paint film was washed for 100 cycles. Before reading, the panels were rinsed with water followed by being completely dried at room temperature. Y value of the paint film surface area which was covered by stain mark was tested and labeled as Y1. The stain resistance ratio was defined as R, and $$R = \frac{Y1}{Y0} \times 100\%$$

Stain resistance performance for each stain was evaluated by following the standard described in Table 1.

TABLE 1

Ranking standard for stain resistance performance

| Stain resistance ranking | R |
|---|---|
| 10 | 95% < R ≤ 100% |
| 9 | 90% < R ≤ 95% |
| 8 | 85% < R ≤ 90% |
| 7 | 80% < R ≤ 85% |
| 6 | 75% < R ≤ 80% |
| 5 | 70% < R ≤ 75% |
| 4 | 65% < R ≤ 70% |
| 3 | 60% < R ≤ 65% |
| 2 | 50% < R ≤ 60% |
| 1 | R ≤ 50% |

III. Experimental Examples

1. Preparation for the Dispersion of Polymer Shell Encapsulated Titanium Dioxide Particles (Polymer-TiO$_2$ Dispersion)

A 250 ml flask equipped with a magnetic stirrer, an N$_2$-inlet, a reflux condenser, a heating mantel, and a thermocouple was charged with 20 g of SEM, 4 g of DMAEMA, 10 g of BA, 16 g of MMA, 1.1 g of n-DDM, 0.5 g of AIBN, and 100 g of n-propanol. The flask was purged with N$_2$, and heated to 80° C. for 3 hours. The temperature was then raised to 93° C., and 0.25 g of AIBN in 2.0 g n-propanol was added. The temperature was held at 93° C. for 1 hour; then the flask was cooled to room temperature. The product was poured into 100 ml of hexane, and was dried. The dried product was dissolved in sufficient water and NH$_3$ to make a 21.3% solution at pH 5.0 to prepare a dispersant polymer.

A steel grind pot was charged with 31.7 g of the dispersant polymer and 95.2 g of water. 450 g TI-PURE™ R-706 TiO$_2$ was added slowly while grinding at 2000 rpm using a Model 50 Lab Dispersator equipped with a disk blade. The mixture was ground for 20 min, and then an additional 11.3 g of water was added to make a 76.5% TI-PURE R-706 TiO$_2$ slurry.

A 1 gallon four-neck round-bottom flask equipped with a paddle stirrer, an N$_2$-inlet condenser, a heating mantel, and a thermocouple was charged with 1816 g of the slurry along with a solution of 13.81 g DS-4 (23% solids) in 251.05 g DI water. The flask was purged with N$_2$, and heated to 30° C. Then 50 g 0.1% iron sulfate and 4 g 1% EDTA were added into the reactor. Two minutes later, co-feed #1 consisting of 2 g t-BHP dissolved in 110.53 g DI water and co-feed #2 consisting of 8.28 g IAA dissolved in 96.25 g DI water were fed to the reactor. Two minutes after the addition of the co-feed solutions, a first monomer emulsion (ME1) prepared previously by mixing 56.52 g DI water, 6.9 g DS-4, and 261.67 g monomers (45.6% BA, 53.4% MMA and 1.0% MAA) was fed to the reactor. Then, a second monomer emulsion (ME2) prepared by mixing 269.5 g DI water, 20.71 g DS-4, and 779.5 g monomers (45.6% BA, 53.4% MMA and 1.0% MAA) was fed to the reactor. Reaction continued for another 20 min. The contents of the reactor were then cooled to room temperature, followed by feeding 84 g NaOH solution (6% solids) in 40 min. Small amounts of gel were filtered by a 100 mesh filter. The remainder was the dispersion of polymer encapsulated titanium dioxide particles. The dispersion comprised 33% titanium dioxide particles, 26% (co)polymeric particles, and water.

2. Preparation for Polymeric Duller Dispersion of (Co) Polymeric Particles

A reactor equipped with stirrer and condenser and blanketed with nitrogen was charged with 208 g of DI water and 0.38 g of sodium carbonate, and was heated to 82° C. 15% of mixture 1 (MIX1) of 98 g of BA, 0.25 g of butylenes glycol diacrylate, 2.0 g of ALMA, 4.0 g of 10% DS-4 solution, and 40 g of DI water, and 25% of mixture 2 (MIX2) of 0.063 g of potassium persulfate, and 35 g of DI water, were added to the reactor contents. The temperature was maintained at 82° C. and the reaction mixture was stirred for 1 hour, after which the remaining MIX1 and MIX2 were metered in to the reactor, with stirring, over a period of 90 minutes. Stirring was continued at 82° C. for 2 hours, after which the reactor contents were cooled to room temperature. The resulting mixture was a (co)polymeric particles emulsion having an average diameter of 0.2 µm as measured by a NanoBrook 90Plus Zeta Particle Size Analyzer from Brookhaven Instruments Company.

A mixture 3 (MIX3) of 35 g 0.2 µm average diameter polymeric particles emulsion prepared according to above process (as seed particles), 0.081 g sodium carbonate and 185.0 g DI water was added to the reactor and heated to 88° C. with stirring. A mixture 4 (MIX4) consisting of 82.0 g BA, 18.0 g STY, 2.5 g 10% DS-4 solution and 32.0 g DI water, a mixture 5 (MIX5) consisting of 19.0 g 1-hexanethiol, 2.8 g 10% DS-4 solution and 11.0 g DI water and a mixture 6 (MIX6) consisting of 0.11 g potassium persulfate dissolved in 18.0 g DI water were metered in to the reactor over a period of 3 hours, after which the temperature was maintained at 88° C., with stirring, for 90 minutes. The reactor contents were cooled to 65° C., a mixture 7 (MIX7) consisting of 0.18 g t-BHP dissolved in 3.7 g DI water and 4.1 g 3% SFS solution were added, and the reactor contents were maintained at 65° C., with stirring, for 1 hour, after which the reactor contents were cooled to room temperature. The resulting mixture was a (co)polymeric particles emulsion having an average diameter of 0.5 µm as measured by the NanoBrook 90Plus Zeta Particle Size Analyzer.

A reactor equipped with a stirrer and condenser and blanketed with nitrogen was charged with a mixture 8 (MIX8) consisting of 3.7 g 0.5 µm average diameter polymeric particles emulsion prepared by above process (as seed particles) and 1830 g DI water, and then heated to 92° C. A mixture 9 (MIX9) consisting of 9.0 g 23% DS-4 solution, 556.0 g BA, 23 g ALMA and 248 g DI water) and a mixture 10 (MIX10) consisting of 1.2 g 23% DS-4 solution, 4.05 g t-butyl peroctoate and 10.0 g DI water were separately emulsified with a hand-held high shear mixer until a stable emulsion was obtained (0.8-3 minutes). MIX9 was then slowly fed into the reactor over one hour. With the reactor contents at 64° C., MIX10 was added as a shot to start the reaction which was complete about 1.5 hours later. The resulting mixture was cooled to room temperature and analyzed by examined by optical microscopy and a Coulter Counter. The resulting mixture was cooled to room temperature and analyzed by an optical microscopy. The resulting mixture was the dispersion of polymeric duller of (co)polymeric particles having an average diameter of 5 m.

3. Preparation of the Aqueous Paint Composition

Comparative Paints 1 and 2 (Comp. 1 or 2), and Paints 1, 2, and 3 (Paint 1, 2, or 3) were prepared according to the procedure of Table 2. The Grind ingredients were mixed using a high speed Cowles disperser. The Let-down ingredients were added using a conventional lab mixer.

TABLE 2

| Materials | Paint Compositions | | | | |
|---|---|---|---|---|---|
| | Comp. 1 | Comp. 2 | 1 | 2 | 3 |
| "Grind" | | | | | |
| Water | 64.21 | 0.00 | 0.00 | 0.00 | 19.26 |
| TI-PURE R-706 TiO$_2$ | 135.00 | 0.00 | 0.00 | 0.00 | 40.50 |
| OROTAN 731A dispersant | 7.04 | 0.00 | 0.00 | 0.00 | 2.10 |
| TEGO Foamex 825 defoamer | 0.50 | 0.00 | 0.00 | 0.00 | 0.15 |
| "Let-down" | | | | | |
| polymer-TiO$_2$ dispersion | 0.00 | 638.00 | 549.66 | 638.00 | 384.76 |
| PRIMAL AC-365 binder | 375.00 | 18.24 | 0.00 | 0.00 | 112.5 |
| Polymeric Duller | 265.36 | 140.00 | 265.36 | 160.00 | 265.36 |
| LAPONITE RD anti-settle agent | 33.18 | 27.00 | 33.18 | 17.00 | 33.18 |
| TRITON EF-106 wetting agent | 1.00 | 1.00 | 1.00 | 1.00 | 1.00 |
| COASOL coalescent | 13.12 | 12.25 | 13.12 | 15.22 | 13.12 |
| TEGO Foamex 825 defoamer | 0.50 | 1.00 | 1.00 | 1.00 | 1.00 |
| ACRYSOL RM-8W rheology modifier | 8.2 | 0.00 | 10.44 | 0.00 | 10.44 |
| ACRYSOL RM-2020 rheology modifier | 10.00 | 10.00 | 10.00 | 10.00 | 10.00 |
| AMP-95 base | 0.24 | 0.24 | 0.24 | 0.24 | 0.24 |
| water | 86.64 | 152.27 | 116.00 | 159.05 | 106.39 |
| Total | 1000.00 | 1000.00 | 1000.00 | 1000.00 | 1000.00 |
| Paint characteristics | | | | | |
| Total PVC | 40% | 38% | 40% | 40% | 40% |

IV. Results

TABLE 3

| Paints | | Comp. 1 | Comp. 2 | 1 | 2 | 3 |
|---|---|---|---|---|---|---|
| Polymeric duller dosage (%) | | 20.8 | 10.4 | 20.8 | 12.0 | 20.8 |
| TiO$_2$ particles | Total TiO$_2$ dosage (%) | 33.1 | 48.9 | 33.1 | 49.2 | 33.1 |

TABLE 3-continued

| Paints | | Comp. 1 | Comp. 2 | 1 | 2 | 3 |
|---|---|---|---|---|---|---|
| | Un-encapsulated TiO$_2$ (%) | 100 | 0 | 0 | 0 | 30 |
| | Encapsulated TiO$_2$ (%) | 0 | 100 | 100 | 100 | 70 |
| Properties | Contrast ratio | 88.0 | 96.6 | 94.9 | 95.7 | 94.6 |
| | Stain resistance ranking | 7.6 | 8.4 | 9.4 | 8.2 | 9.0 |
| | Gloss (20) | 1.4 | 2.5 | 1.6 | 1.6 | 1.6 |
| | Gloss (60) | 4.4 | 13.4 | 5.5 | 5.9 | 5.7 |
| | Gloss (85) | 15.1 | 39.8 | 15.4 | 19.7 | 16.5 |

% is dry weight percentage based on total dry weight of the paint composition.

As shown in Table 3, Comparative Paint 2 (Comp. 2) did not comprise enough polymeric duller (less than required 11% by dry weight based on total dry weight of the paint composition), compared to 12% of Paint 2, therefore, showed very poorer glosses at respectively 20, 60 and 85 degree geometry (2.5/13.4/39.8) compared to those of Paint 2 (1.6/5.9/19.7). The result indicated the critical role played by the polymeric duller in providing paints with satisfactory glosses.

Comparative Paint 1 (Comp. 1) did not comprise polymer shell encapsulated titanium dioxide particles, and showed a poorer opacity as indicated by contrast ratio compared to Paints 1 and 3. Its stain resistance is also poorer. This result indicated the critical role played by the polymer shell encapsulation of titanium dioxide particles with (co)polymeric particles in providing paints with satisfactory opacity and stain resistance.

What is claimed is:

1. An aqueous low sheen paint composition comprising by dry weight based on total dry weight of the aqueous low sheen paint composition, from 11% to 35% of a polymeric duller of (co)polymeric particles having an average diameter of from 1 to 20 μm, and a minimum film forming temperature (MFFT) of above 50° C., and from 25% to 70% of titanium dioxide particles;

wherein from 50% to 100% of the titanium dioxide particles are encapsulated by (co)polymer shells.

2. The aqueous low sheen paint composition according to claim 1 further comprising a binder component comprising film forming (co)polymeric particles.

3. The aqueous low sheen paint composition according to claim 2 wherein the film forming (co)polymeric particles of the binder component have a minimum film forming temperature (MFFT) of from −50 to 100° C.

4. The aqueous low sheen paint composition according to claim 2 wherein the (co)polymeric particles of the film forming (co)polymeric particles of the binder component have an average diameter of from 50 to 500 nm.

5. The aqueous low sheen paint composition according to claim 1 wherein the (co)polymeric particles of the polymeric duller have an average diameter of from 3 to 7 μm.

6. The aqueous low sheen paint composition according to claim 1 wherein the (co)polymer shells encapsulating the titanium dioxide particles have a minimum film forming temperature of from −50 to 100° C.

7. The aqueous low sheen paint composition according to claim 1 wherein the (co)polymer shells encapsulating the titanium dioxide particles are made from (co)polymeric particles which have an average diameter of from 200 to 800 nm.

* * * * *